Oct. 9, 1951     O. D. HANSON, JR     2,570,550
CLOSURE CAP FOR FUEL TANKS
Filed March 7, 1949
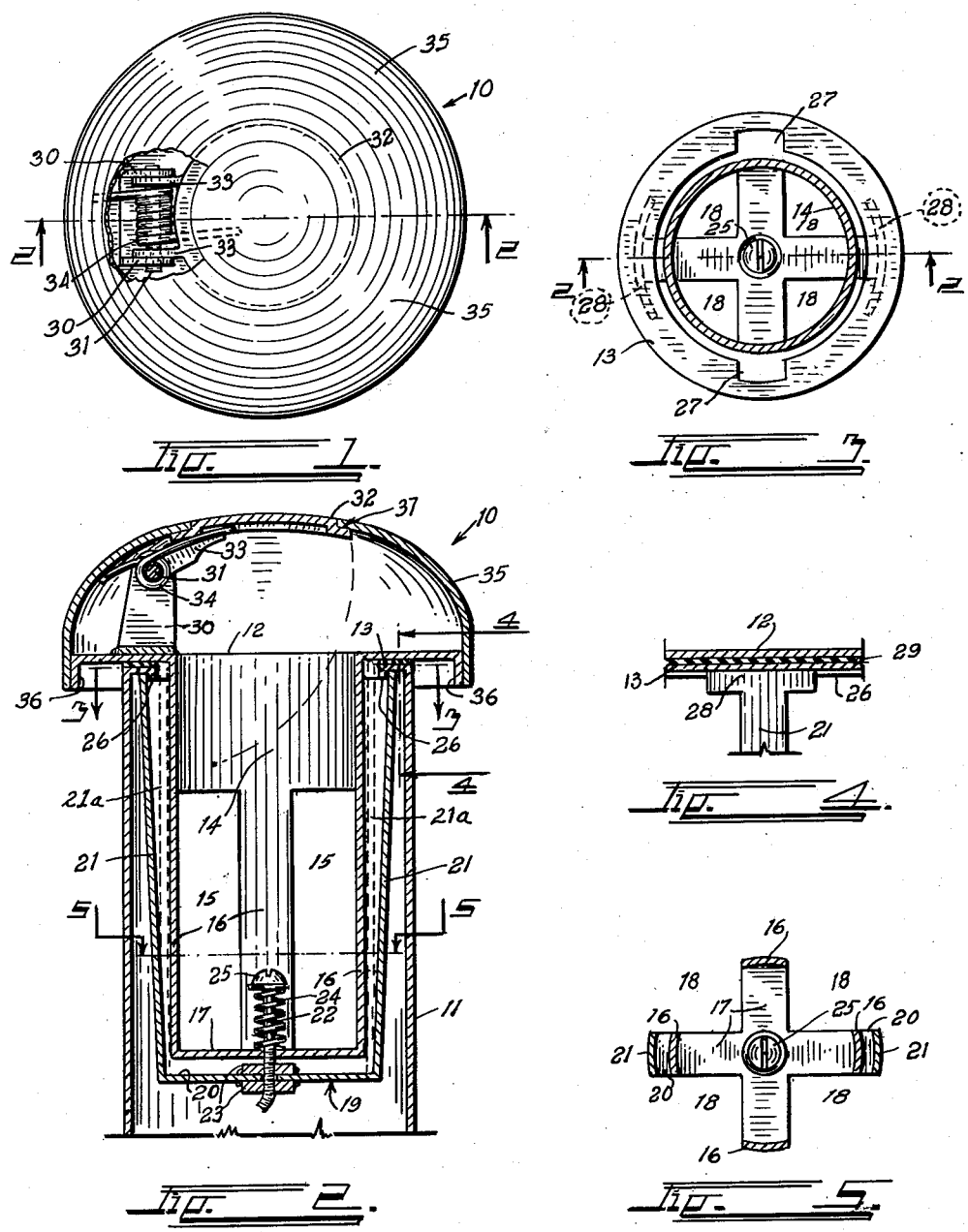
INVENTOR
OLIVER D. HANSON Jr.
By Martin E. Anderson
ATTORNEY.

Patented Oct. 9, 1951

2,570,550

UNITED STATES PATENT OFFICE 2,570,550

CLOSURE CAP FOR FUEL TANKS

Oliver D. Hanson, Jr., Denver, Colo.

Application March 7, 1949, Serial No. 80,023

2 Claims. (Cl. 220—86)

1

This invention relates to fuel tank closure devices and more particularly to a theft proof locking device similar to those disclosed in my copending application, Serial No. 48,020, filed September 7, 1948.

In automobiles and other vehicles which are propelled by gasoline or other fuel, the fuel tank filler opening is usually closed by a removable filler cap. Careless attendants in service stations frequently fail to replace these caps after filling the tank, which results in loss of valuable fuel by spillage on the streets and highways with its attendant fire hazard, and also disconcertment to the vehicle operator since he must procure another cap. Since caps of this type are easily accessible and readily removable, they also offer a temptation to thieves who either abscond with the cap itself, or the contents of the tank which may be removed by a syphon hose.

Devices have been proposed intended to obviate some of the foregoing disadvantages of caps of this type, but so far as is known, they have been complicated in construction, expensive to manufacture, and not fully satisfactory in obviating all of the disadvantages.

The principal object of this invention, therefore, is to provide an improved attachment for vehicle fuel tanks which may be permanently attached to the filler neck or pipe thereof, yet permit filling of the tank.

Another object is to provide a simplified locking device for securing a fuel tank closure device to the tank against unauthorized removal therefrom.

Another object is to provide a closure locking device which automatically assumes a position in the tank filler neck to lock the device thereto when the closure is inserted therein.

Another object is to provide a closure locking device which resiliently urges the closure onto the top of the filler neck, the resilient urge being adjustable.

Another object is to provide a closure device which has portions extending into the filler neck but obviates obstruction of the flow of fuel when the tank is being filled.

A further object is to provide an improved cap which will open automatically upon application of pressure thereto by the end of a filler hose nozzle and will automatically assume a closed position when the nozzle is removed.

Still further objects, advantages, and salient features will become apparent from a consideration of the description to follow, the appended claims, and the accompanying drawing, in which:

Figure 1 is a top plan of the closure device, a

2 portion being broken away to show certain details;

Figure 2 is a section taken on line 2—2, Figures 1 and 3;

Figure 3 is a section taken on line 3—3, Figure 2;

Figure 4 is a section taken on line 4—4, Figure 2; and

Figure 5 is a section taken on line 5—5, Figure 2.

Referring in detail to the drawing the closure 10, which constitutes the subject of the invention, is shown attached to a conventional fuel tank filler neck 11, the latter being connected at its lower end to the fuel tank (not shown). The closure comprises a plate 12, which rests upon the top flange 13 of the filler neck, and a downwardly extending tubular portion 14 which is provided with slots 15, thus forming a plurality of strips 16. These strips are connected at their lower ends by a base 17 of cruciform shape, as shown in Figure 5, to provide cut-out portions 18. The plate 10 and the tubular portion depending therefrom may be made as an integral piece of sheet metal suitably drawn and blanked.

A U-shaped member 19 having a bight portion 20 at its lower end and upwardly extending resilient legs 21 is disposed around the tubular depending portion just described. This member is secured to the downwardly extending tubular member by a screw 22 which threadedly engages the bight portion by nuts 23 secured to the bight portion by solder, or the like, the screw passing through a hole in the base 17 and having a spring 24 interposed between the base 17 and the head 25 of the screw, as shown in Figure 2.

In applying the closure to the filler neck, the former is inserted into the latter until the plate 12 rests on flange 13 of the filler neck. The position of the legs 21 of the U-shaped member is now somewhat as shown by the dotted line positions 21a. A screw driver or other tool is then applied to the head 25 of screw 22 and a downward pressure is applied. The resilient legs then snap over the reentrant rim 26 of the flange 13 and when pressure is released on the screw the legs assume the full line position beneath the flange as shown in Figure 2. If additional pressure between plate 12 and flange 13 is desired the spring 24 is compressed by rotating screw 22. The lower end of this screw is deformed as shown in Figure 2 to prevent its removal as it is apparent that if the screw could be removed, the closure could be removed from the filler neck leaving the U-shaped member therein.

Flange 13 is normally provided with a pair of slots 27 which receive ears on the conventional closure cap (not shown) furnished with the tank. To guard against possible rotation of legs 21 relative to the flange and removal of the top ends of these legs through these slots, the legs are made somewhat wider than the slots as shown by portions 28. It is apparent that even though portions 28 might be disposed beneath slots 26, they will always overlap and prevent removal of the U-shaped member therethrough. A gasket 29 of cork or the like will normally be employed between plate 12 and flange 13 to prevent leakage therebetween.

The plate 12 is provided with a pair of lugs 30 which carry a pivot pin 31 on which a valve 32 is adapted to pivot, the valve having ears 33, secured to one edge thereof, which engage the pin. A suitable spring 34 is disposed about the pin and urges the valve upwardly.

A cap 35, secured at its lower edge to a downturned flange 36 on plate 12 is formed with a seat 37 against which the valve rests when in closed position.

It will be noted that the slots or cut away portions at the sides and bottom of the tube provide openings of sufficient size through which the fuel may flow without any substantial obstruction while the tank is being filled. It is also to be observed that the valve construction is quite compact since the space within the tube is utilized to swing the valve into it as shown by the dotted lines.

Having described the invention what is claimed as new is:

1. An attachment for a filler neck on a gasoline tank, the filler neck being of the type having an inturned flange at its upper end with a reentrant rim at the inner edge of the flange, comprising; an annular plate adapted to rest on the outside surface of the flange, a cylindrical tube having its upper open end connected to the inner edge of the plate adapted to project downwardly into the neck, the tube being cup-shaped and having a transverse base at its lower end, the base having angularly spaced apertures therein to form a spider between the apertures, the spider having radially extending legs, the side wall of the tube having longitudinally extending angularly spaced apertures therein aligned at their lower ends with the apertures in the base forming legs therebetween which connect at their lower ends with outer ends of the radially extending legs of the spider, the apertures in the side walls providing conduits through which gasoline may flow laterally toward the filler neck and thence downwardly into the tank, a U-shaped member having a bight portion spaced below the spider and a pair of locking legs extending upwardly adjacent the tube, the upper free ends of the locking legs terminating outwardly of the rim and adapted to abut the lower surface of the flange, the locking legs being resiliently urged outwardly by their connection with the bight portion, a screw extending through the central portion of the spider having an enlarged head disposed in spaced relation above the spider, the lower end of the screw threadedly engaging the bight portion, and a spring disposed between the head and the upper surface of the spider urging the screw upwardly, whereby the free ends of the locking legs are resiliently urged upwardly, and closure means connected to the plate, the construction being such that when the attachment is inserted into the filler neck to a position where the plate rests on the flange and a downward pressure is applied to the head of the screw, the free ends of the U-shaped member are forced downwardly beneath the reentrant rim and spring outwardly, release of pressure on the head of the screw permitting the free ends of the legs to resiliently engage the lower surface of the flange.

2. In an attachment for a filler neck on a gasoline tank, the filler neck being of the type having an inturned flange at its upper end with a reentrant rim at the inner edge of the flange, the attachment including a plate adapted to rest on the outside surface of the flange and carrying a downwardly extending tube adapted to be disposed within the filler neck, the improvement which comprises; a U-shaped member having a bight portion spaced below the lower end of the tube and a pair of locking legs extending upwardly adjacent the tube having free ends adapted to engage the lower surface of the flange, the locking legs being resiliently urged outwardly by their connection with the bight portion, resilient means urging the bight portion toward the lower end of the tube, and means within the tube connected to the bight portion adapted to be urged downwardly against the urge of the resilient means for permitting the free ends of the locking legs to pass beneath the reentrant rim and automatically spring outwardly, release of the downward urge permitting the resilient means to resiliently urge the free ends of the locking legs upwardly against the lower surface of the flange.

OLIVER D. HANSON, Jr.

REFERENCES CITED

The following references are of record in the file of this patent:

UNITED STATES PATENTS

| Number | Name | Date |
|---|---|---|
| 1,810,019 | Jaworsky | June 16, 1931 |
| 1,818,608 | Chafkin | Aug. 11, 1931 |
| 2,037,499 | Collard | Apr. 14, 1936 |
| 2,107,600 | Darms | Feb. 8, 1938 |
| 2,284,107 | Sullivan | May 26, 1942 |
| 2,464,579 | Hovanian | Mar. 15, 1949 |
| 2,503,031 | Davidson | Apr. 4, 1950 |